(12) United States Patent  
Shiba

(10) Patent No.: US 6,697,853 B2
(45) Date of Patent: Feb. 24, 2004

(54) METHOD FOR CONTROLLING COMMUNICATION CONTROL APPARATUS

(75) Inventor: Shugo Shiba, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 195 days.

(21) Appl. No.: 10/054,995

(22) Filed: Jan. 25, 2002

(65) Prior Publication Data

US 2002/0131448 A1 Sep. 19, 2002

(30) Foreign Application Priority Data

Mar. 16, 2001 (JP) .................................. 2001/076235

(51) Int. Cl.[7] ............................................. G06F 15/123
(52) U.S. Cl. ........................ 709/220; 709/223; 709/224
(58) Field of Search ............................... 709/223, 224, 709/220; 370/230, 254, 235

(56) References Cited

U.S. PATENT DOCUMENTS 3,991,406 A  * 11/1976  Downing et al. ............. 714/10
4,484,295 A  * 11/1984  Bedard et al. ................ 708/8
5,235,700 A  *  8/1993  Alaiwan et al. .............. 714/13

OTHER PUBLICATIONS

"Lan Management with SNMP and RMON" Held et al., Nikkei BP Publication, Jan. 23, 1998, pp. 1–22.

"A Survey of Active Network Technology" Yamamoto et al., The Institute of Electronics, Information and Communication Engineers, Technical Report of IBICB, IN99–117 (Feb. 2000), pp. 19–24.

* cited by examiner

Primary Examiner—Frantz B. Jean
(74) Attorney, Agent, or Firm—Venable LLP; Michael A. Sartori

(57) ABSTRACT

According to the present invention, if an EMS110 needs to conduct control over a prescribed group of nodes 120 in the IP network 140 to exert a predetermined function, that is, to change the control mode, it creates, according to a control program, an active program AP which stores a control-subject address table and control contents of that group and then transfers it through a control network 150. At each node 120, if the active program executed by itself has normally ended, records this normal ending in the control-subject address table of the active program AP and also, based on this control-subject address table, transmits the active program to such a node 120 in the control-subject group that has not executed that program yet. If the active program AP has abended, on the other hand, it records this abending in the control-subject address table of the active program AP and also transmits the active program AP to the EMS110, thus suspending the control processing.

15 Claims, 11 Drawing Sheets

| NODE ADDRESS TABLE: | |
|---|---|
| NODE 102-1 | IP ADDRESS OF NODE 102-1 |
| NODE 102-2 | IP ADDRESS OF NODE 102-2 |
| NODE 102-3 | IP ADDRESS OF NODE 102-3 |
| NODE 102-4 | IP ADDRESS OF NODE 102-4 |
| NODE 102-5 | IP ADDRESS OF NODE 102-5 |
| NODE 102-6 | IP ADDRESS OF NODE 102-6 |

TABLE FOR EXPLAINING NODE ADDRESS TABLE 111

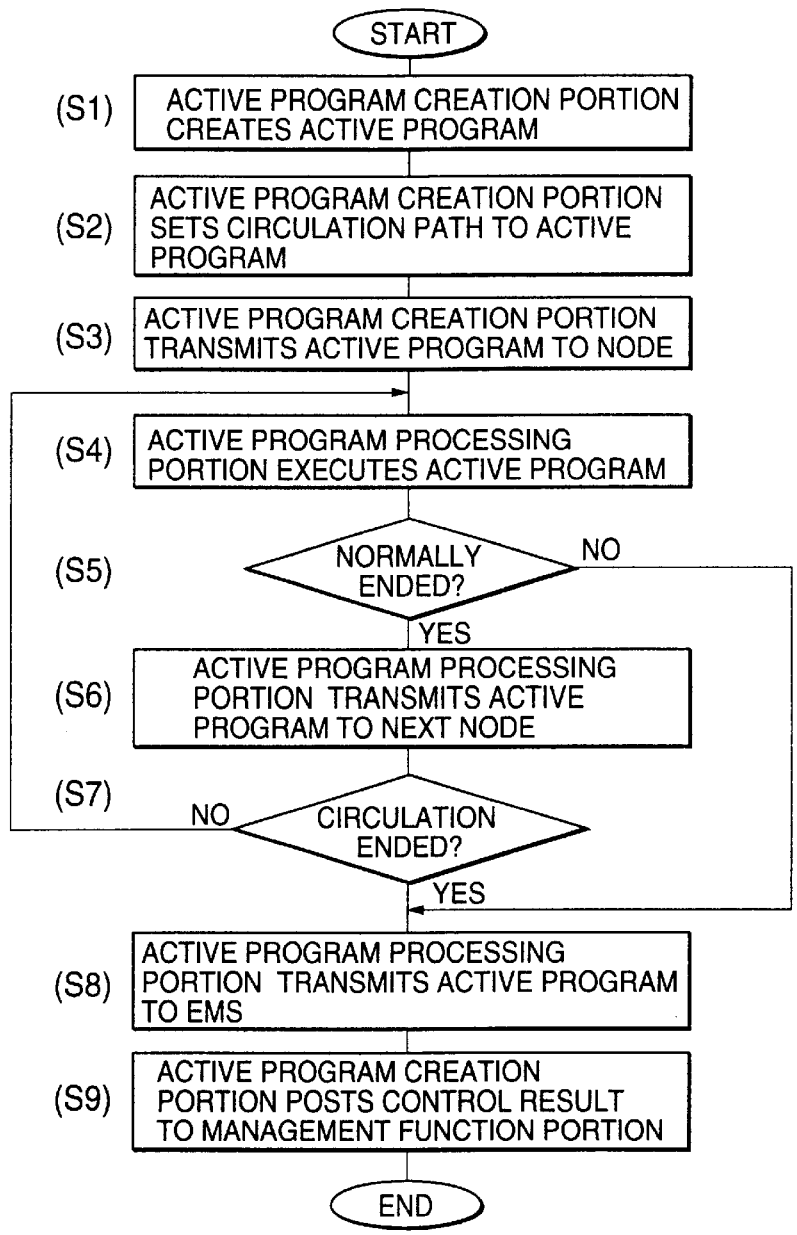

FIG.4

CONTROL-SUBJECT ADDRESS TABLE

| CONTROL SUBJECT | ACTIVE PROGRAM PROCESSING STATE |
|---|---|
| IP ADDRESS OF NODE 120-1 | UNEXECUTED / NORMALLY ENDED / ABENDED |
| IP ADDRESS OF NODE 120-2 | UNEXECUTED / NORMALLY ENDED / ABENDED |
| IP ADDRESS OF NODE 120-3 | UNEXECUTED / NORMALLY ENDED / ABENDED |
| IP ADDRESS OF NODE 120-4 | UNEXECUTED / NORMALLY ENDED / ABENDED |
| IP ADDRESS OF NODE 120-5 | UNEXECUTED / NORMALLY ENDED / ABENDED |
| IP ADDRESS OF NODE 120-6 | UNEXECUTED / NORMALLY ENDED / ABENDED |

FIG.5

|  | TIME CONDITIONS |
|---|---|
| VALID PERIOD | SPECIFIES VALID PERIOD<br>FORMAT:yyyymmddhhmmss:yyyymmddhhmmss<br>yyyy:4-DIGIT CHRISTIAN-ERA YEAR  mm:MONTH (01~12)<br>dd:DAY (01~31)  hh:HOUR (00~23)<br>mm:MINUTE (00~59)  ss:SECOND (00~59)<br>SPECIFICATION EXAMPLE:20010101000000:20010131235959<br>(VALID FROM 0:0:0 ON JAN. 1ST, 2001 TO 23:59:59 ON JAN. 31ST, ON 2001) |
| VALID MONTH | SPECIFIES VALID MONTH<br>FORMAT:bbbbbbbbbbbb<br>(CHARACTER STRING CONSISTING OF 12 "0"S AND "1"S, WHERE "0" INDICATES INVALIDITY, "1" INDICATES VALIDITY, AND TOP INDICATES JANUARY)<br>SPECIFICATION EXAMPLE:100100000000 (JANUARY AND APRIL ARE VALID) |
| VALID DAY | SPECIFIES VALID DAY<br>FORMAT:bb~bb(CHARACTER STRING CONSISTING OF 31 "0"S AND "1"S, IN WHICH "0" INDICATES INVALIDITY, "1" INDICATES VALIDITY, AND TOP INDICATES 1ST)<br>SPECIFICATION EXAMPLE:1000000000000000000000000000001<br>(FIRST AND 31ST DAYS ARE VALID) |
| VALID DAY-OF-THE-WEEK | SPECIFIES DAY-OF-THE-WEEK<br>FORMAT:bbbbbbb(CHARACTER STRING CONSISTING OF 7 "0"S AND "1"S, IN WHICH "0" INDICATES INVALIDITY, "1" INDICATES VALIDITY, TOP INDICATES SUNDAY)<br>SPECIFICATION EXAMPLE:0111110(MONDAY THROUGH FRIDAY ARE VALID) |
| VALID TIME | FORMAT:hhmmss:hhmmss<br>hh:HOUR(00~23)  mm:MINUTE(00~59)<br>hh:SECOND(00~59)<br>SPECIFICATION EXAMPLE:000000:235959(VALID FROM 0:0:0 TO 23:59:59) |

TABLE FOR EXPLAINING TIME CONDITIONS

FIG.10

METHOD FOR CONTROLLING COMMUNICATION CONTROL APPARATUS

BACKGROUND OF THE INVENTION

1. Field of the Invention

The present invention relates to a method for conducting effective control with a small management load in an IP network comprised of a communication control apparatus having a function to transfer an IP (internet protocol) packet, inject a program, and execute the program and a network management system for controlling a plurality of the communication control apparatuses.

2. Description of the Related Art

An IP network is comprised of a plurality of communication control apparatuses each having an IP packet transfer means called a node. This IP network is of a connection-less type and has been prevailing in the society because it is easy to use and has a wide compatibility.

An IP network is most typically managed using an SNMP (Simple Network Management Protocol) and an MIB (Management Information Base) which are standardized or regulated by the IETF (Internet Engineering Task Force). The SNMP is a transfer protocol between a network management system and a node called an EMS (Element Management System) and MIB, a database which defines node control or information. Each node can be managed by the EMS when it reads and writes an MIB installed at the node.

An example of a prior art controlling method for managing an IP network is described with reference to FIG. 2. FIG. 2 is a block diagram for showing a control configuration in a typical IP network.

An IP network 240 shown in FIG. 2 is comprised of a plurality of nodes 220-1 to 220-6 connected thereto, each of which is connected through its dedicated control line to an EMS210 using a protocol regulated by the SNMP. These nodes 220-1 to 220-6 have MIB221-1 to 221-6 respectively.

For example, when the node 220-1 needs to be controlled by the EMS210, the MS210 uses through the control line a protocol regulated by the SNMP to make access to the MIB1-2 at the node 220-1 in order to write an appropriate value to a relevant item present in this MIB221-1, thus controlling this node 220-1.

Furthermore, when the EMS210 needs to reference information of the node 220-2, the EMS210 uses through the control line a protocol regulated by the SNMP to make access to the MIB221-2 at the node 220-2 in order to read out a value of a relevant item present in this MIB221-2, thus referencing the information of this node 220-2.

The details of such a prior art network controlling method are specifically disclosed in, for example, "LAN Management with SNMP and RMONP" by Gilbert Held; Tohru Asami, Yoshihiro Itoh, Wataru Kubota; issued by Nikkei BP Publication (ISBN4-8222-8021-7); Jan. 23, 1998; pages 1–22.

Such a prior art network controlling method provides a one-to-many relationship between the EMS210 and the node 220, thus suffering from a problem that with an increasing number of the nodes 220 managed by the EMS210, the load on the EMS210 increases.

Furthermore, to control all the plurality of nodes 220 managed by the EMS210, it is necessary to simultaneously conduct control by use of the SNMPs for all the nodes 220 through the control line, thus increasing the management traffic.

Further, since the items of the node 220 which can be managed by the EMS210 are limited to the contents regulated by thew MIB221, for example, the side of the EMS210 must conduct control by means of time specification not regulated by the MIB221, thus having a disadvantage that it is impossible to perform processing in closer contact with an application for each of the nodes 220, for example, network control in strict synchronization with each of the nodes.

SUMMARY OF THE INVENTION

It is an object of the present invention to provide a method for controlling a communication control apparatus that can solve those problems.

To solve those problems, a communication control apparatus controlling method of the present invention performs processing as follows in a network system having a plurality of interconnected communication control apparatuses and a network management system for managing these multiple communication control apparatuses.

To change a control mode for a predetermined group among this plurality of communication control apparatuses:
  a) this network management system creates an active program which stores an address table of each of the communication control apparatuses belonging to this group and contents of this control mode;
  b) this network management system transfers this active program to this group of communication control apparatuses according to this address table; and
  c) A communication control apparatuses of this group that has received this active program executes this active program to change the control mode, in which:
    c-1) if this control mode is changed successfully, this success is recorded in this address table and then, based on this address table, this active program in this group is transmitted to a communication control apparatus which has not executed it yet; and
    c-2) if this control mode could not be changed, a failure is recorded in this active program, which is then transmitted to this network management system.

Another communication control apparatus controlling method of the present invention performs processing as follows in a network system having a plurality of interconnected communication control apparatuses and a network management system for managing this plurality of communication control apparatuses.

To change a control mode for a predetermined group among this plurality of communication control apparatuses:
  a) this network management system creates a first active program which stores a first address table of each of the communication control apparatuses belonging to this group;
  b) this network management system transmits this first active program to a communication control apparatus of this group according to this first address table;
  c) the communication control apparatus of this group that has received this first active program executes this first active program and holds thus changed control mode in a "standby state" to then record in the first address table a fact that this communication control apparatus is holding this changed control mode in the "standby state", in which:
    c-1) based on this first address table, this first active program is transmitted to a communication control apparatus which has not executed this first active program yet, if any in this group; and c-2) based on this first address table, the first active program is transmitted to this network management system if all the communication control apparatuses have executed this first active program in this group;

d) this communication control apparatus which has received this first active program creates a second active program which stores therein a second address table of each of the communication control apparatuses belonging to this group; and e) this network management system transfers this second active program to a communication control apparatus in this group based on this second address table; and f) the communication control apparatus which has received this second active program executes this second active program to switch thus changed control mode from the "standby state" to an "operation state" in order to then record in the second address table a fact that this communication control apparatus is holding this changed control mode in the "standby state", in which:

f-1) based on this second address table, this active program is transmitted to a communication control apparatus which has not executed this second active program yet, if any in this group; and f-2) based on this second address table, this second active program is transmitted to this network management system if all the communication control apparatuses have executed this second active program in this group.

Further another communication control apparatus controlling method of the present invention performs processing as follows in a network management system managing this plurality of communication control apparatuses.

To conduct control by use of an active program for a predetermined group among this plurality of communication control apparatuses:

a) this network management system creates a first active program which stores a first address table of each of communication control apparatuses belonging to this group;

b) this network management system transfers this first active program to a communication control apparatus of this group according to this first address table;

c) the communication control apparatus of this group which has received this first active program executes this first active program to decide whether this control is possible to conduct in order to then record a decision result in this first address table, in which:

c-1) based on this first address table, this first active program is transmitted to a communication control apparatus which has not executed this first active program yet, if any in this group; and c-2) based on this first address table, this first active program is transmitted to this network management system if all the communication control apparatuses have executed this first active program in this group;

d) based on this decision result received in this first address table, this communication control apparatus which has received this first active program creates a second active program which stores a second address table of each of communication control apparatuses belonging to this group;

e) this network management system transfers this second active program to a communication control apparatus of this group according to this second address table; and f) the communication control apparatus of this group which has received this second active program executes this second active program to conduct this control to then record a control result ion this second address table, in which:

f-1) based on this second address table, this second active program is transmitted to a communication control apparatus which has not executed this second active program yet, if any in this group; and f-2) based on this second address table, this active program is transmitted to this network management system if all the communication control apparatuses have executed this second active program in this group.

Still further another communication control apparatus controlling method of this invention performs processing as follows in a network system having a plurality of interconnected communication control apparatuses and a network management system for managing this plurality of communication control apparatuses.

To change a control mode for a predetermined group among this plurality of communication control apparatuses:

a) this network management system creates an active program which stores an address table of each of communication control apparatuses belonging to this group, contents of the control mode, and processing contents of error recovery processing;

b) this network management system transfers this active program to a communication control apparatus of this group according to this address table;

c) the communication control apparatus of this group which has received this active program executes this active program, if yet to do so, to thereby change the control mode, in which:

c-1) if this control mode is successfully changed, this success is recorded in this address table and then, based on this address table, this active program is transmitted to a communication control apparatus which has not executed it yet, if any, in this group; and c-2) if this control mode could not be changed successfully, this failure is recorded in this address table, after which this active program has its own processing contents switched to error recovery processing and then, based on this address table, is transmitted to a communication control apparatus which has successfully executed this active program, if any, in this group and;

d) the communication control apparatus which has received the active program switched to this error recovery processing executes this active program to perform this error recovery processing and then, based on this address table, transmits this active program as switched to this error recovery processing to a communication control apparatus which has successfully executed this active program but is yet to perform this error recovery processing, if any, in this group.

An additional communication control apparatus controlling method of the present invention performs processing as follows in a network system having a plurality of interconnected communication control apparatuses and a network management system for managing this plurality of communication control apparatuses.

To change a control mode for a predetermined group among this plurality of communication control apparatuses:

a) this network management system creates an active program which stores an address table of each of communication control apparatuses belonging to this group and contents and a time condition of this control mode;

b) this network management system transfers this active program to a communication control apparatus of this group according to this address table;

c) the communication control apparatus of this group which has received this active program executes this active program to hold this changed control mode in a "standby state" and also set this time condition in order to then record in this address table a fact that this communication control apparatus has held this changed control mode in the "standby state", in which:

c-1) based on this address table, this active program is transmitted to a communication control apparatus which has not executed this active program yet, if any, in this group; and c-2) based on this address table, this active program is transmitted to this network management system if all the communication control apparatuses have executed this active program in this group; and d) this communication control apparatus which has executed this active program switched this changed control mode from the "standby state" to an "operation state" when the time condition thus set is true.

BRIEF DESCRIPTION OF THE DRAWINGS

FIG. 4 is a flowchart for showing details of a control procedure of the first embodiment;

FIG. 5 is a table for showing a configuration of a control-subject address table stored in an active program;

FIG. 10 is a table for showing a display format for time conditions stored in an active program of a fifth embodiment;

DESCRIPTION OF THE PREFERRED EMBODIMENTS

First Embodiment

Figure 1:
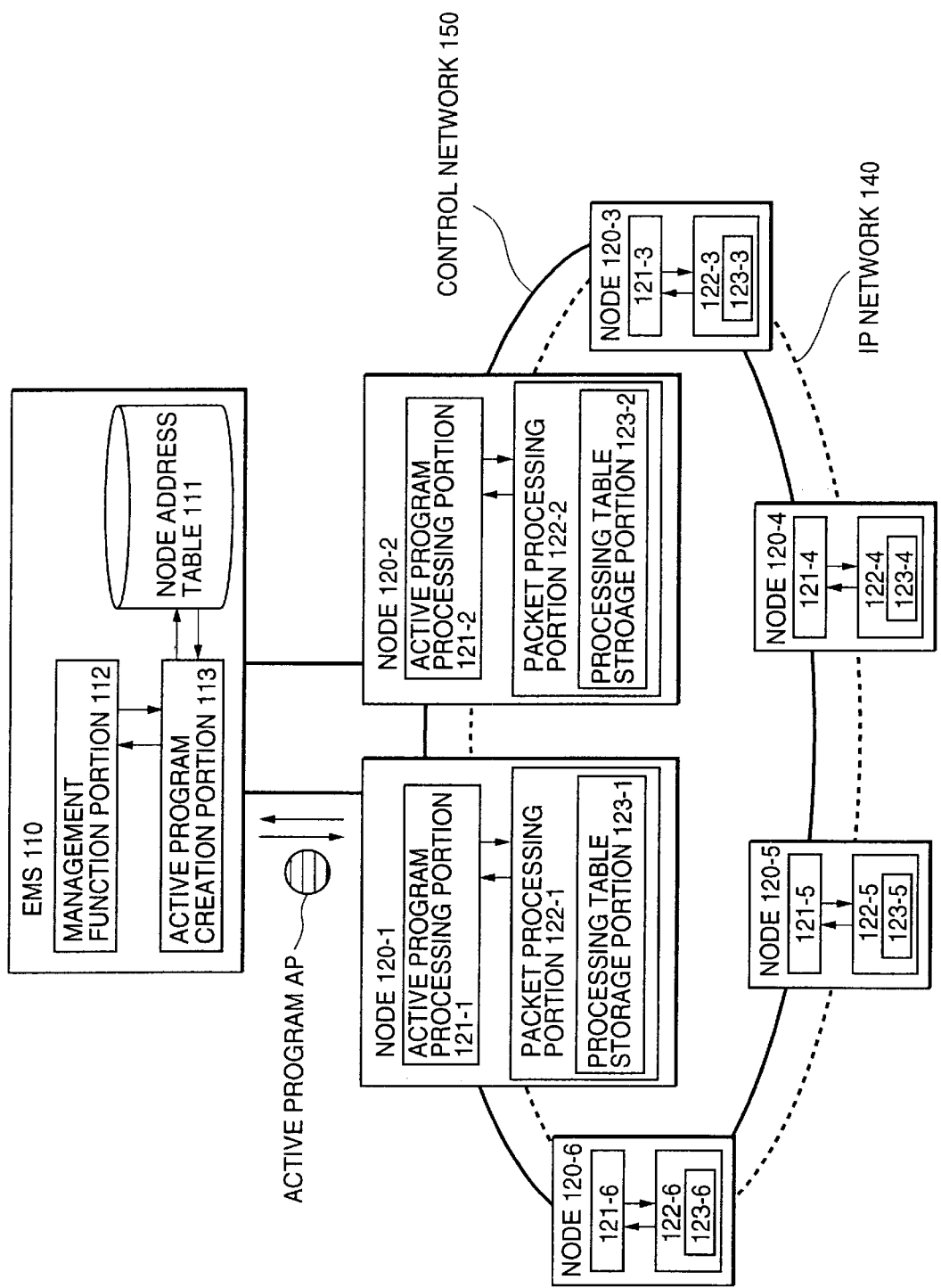
FIG. 1 is a block diagram for showing a configuration of control in an IP network according to a first embodiment of the present invention.

A configuration of a first embodiment of the present invention is shown in FIG. 1. FIG. 1 is a block diagram for showing the configuration of control in an IP network of the first embodiment.

This first embodiment is comprised of nodes 120-1 to 120-6 which are communication control apparatuses interconnected through a line which constitute an IP network 140 for transferring an IP packet and an EMS110 which is a network management system for controlling these nodes. In this configuration, the EMS110 and the nodes 120-1 to 120-6 are connected to each other over a dedicated control network 150 taking security into account.

Note here that the basic roles and operations themselves of a node 120 and the EMS110 in the IP network 140 described below with this embodiment are the same as those in the case of the above-mentioned prior art IP network 240, so that the description of the configuration and operations of such portions that are not directly related to the control system and method of the present invention is omitted. Moreover, the transmission and reception of data among the apparatuses by use of a control network 150 is essentially the same as that of the ordinary IP network 140 and so its description is omitted.

This EMS110 is comprised of a node address table 111, a management function portion 112, and an active program creation portion 113 and operates on a predetermined control program.

Figures 2, 3:
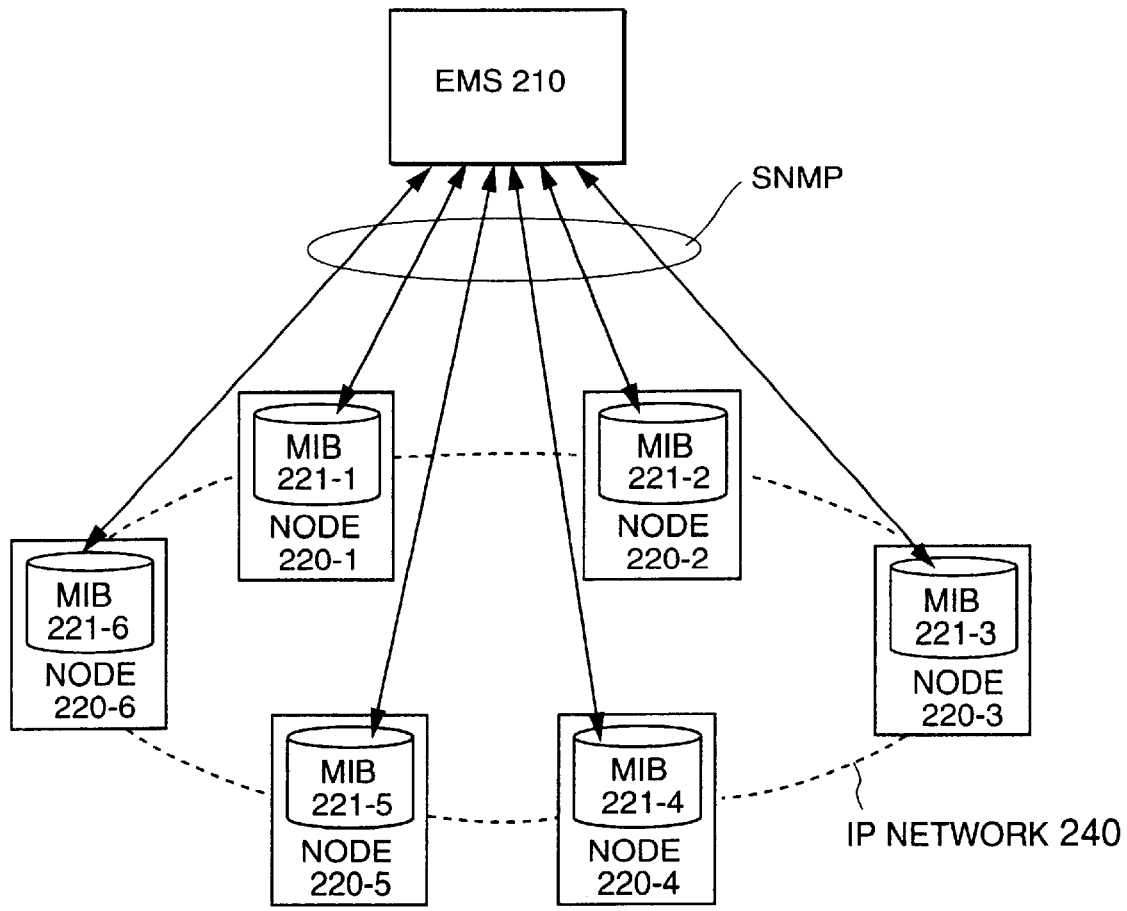
FIG. 2 is a block diagram for showing a configuration of control in a typical IP network.
FIG. 3 is a table for showing a configuration of a node address table 111.

The node address table 111 holds therein data for controlling each of nodes 120. The node address table 111, as its configuration is shown in FIG. 3, registers therein correspondence between a list of the nodes 120-1 to 120-6 managed by the EMS110 and IP addresses the nodes 120-1 to 120-6.

The management function portion 112 is a means for realizing a variety of functions for managing the IP network 140. The active program creation portion 113 is a means for controlling the node 120 by creating an active program AP based on a directive from the management function portion 112 and referencing the node address table 111 to specify a node 120, thus transmitting the active program AP to the subject node 120 through the control network 150.

The active program AP has an object-oriented feature and can autonomously operate in a node 120, having a function to change a processing table at the node 120 where it is activated and also, based on a control-subject table of its own, causes the node 120 to transfer its own copy to any other node 120.

Note here that to "transmit active program AP to XXX" given in this specification means such a processing that "active program AP causes its own copy to be transferred to XXX". In this specification, also, control by an active program over a node 120 means such a processing as packet filtering (which is selection of a packet by use of information of up to layer 4), priority control over packet transfer, and also such a process that is closely related to an application taking into account time conditions etc.

The basic concept about the presence of such a program and the network control by use of such a program is disclosed in, for example, Electronic Information Association, Communication Science Journal, IN99–117 (2000–02), pp. 19024, "Trend in Active Network Technology" by Kan Yamamoto, Hiromasa Ikeda.

Furthermore, the nodes 120-1 to 120-6 have active program processing portions 121-1 to 121-6 and packet processing portions 122-1 to 122-6 respectively. These packet processing portions 122-1 to 122-6 have processing-table storage portion 123-1, . . . , 123-6 for storing a processing table in which the contents of the processing program of the nodes 120-1 to 120-6 are recorded, respectively.

The active program processing portion 121 is a means for receiving an active program AP transmitted through the control network 150 from the EMS110 to then reference and change the execution conditions of the packet processing portion 122, thus transmitting the active program AP to the next node 120.

The packet processing portion 122 is a means for receiving an IP data packet and transmitting it to the next node 120.

By the control method of this first embodiment, to control a node 120, the active program AP is circulated as packet-format data once through the control network 150, featuring a processing procedure taken when the active program AP abended. This processing procedure may be outlined as follows.

First, if the EMS110 needs to conduct control over a prescribed group of nodes 120 in the IP network 140 to exert a predetermined function, that is, to change the control mode, it creates, according to a control program, an active program AP which stores a control-subject address table and control contents of that group and then transfers it through the control network 150. Based on the control-subject address table in the active program AP, each of the nodes 120 decides whether it belongs to the control-subject group and, if not, transfers this active program AP to a relevant node 120 based on the control-subject table of the active program AP. If it belongs, on the other hand, it executes the active program AP it has received, thus conducting communication control.

This node 120, if the active program executed by itself has normally ended, records this normal ending in the control-subject address table of the active program AP and also, based on this control-subject address table, transmits the active program to such a node 120 in the control-subject group that has not executed that program yet.

If the active program AP has abended, on the other hand, it records this abending in the control-subject address table of the active program AP and also transmits the active program AP to the EMS110, thus suspending the control processing.

When the active program AP is circulated through all the nodes 120 belonging to the control-subject group, it transfers a processing result to the EMS110.

Next, this control procedure is detailed below with respect to the flowchart of FIG. 4.

First, at step (S1), the management function portion 112 posts a predetermined control parameter to the active program creation portion 113 in order to conduct control over the exertion of a predetermined function at a predetermined node 120. The active program creation portion 113 creates an active program AP corresponding to this control, to integrate the control parameter posted from the management function portion 112 into the active program AP.

At step (S2), the active program creation portion 113 references the node address table 111 to thereby extract a node address of each of the nodes included in a control-subject group posted from the management function portion 112 to then integrate a list of thus extracted node addresses as a control-subject address table into an active program AP1 and set it as a circulation path.

This control-subject address table, as shown in FIG. 5, stores correspondence between the IP addresses of the nodes 120-1, 120-2, 120-3, 120-4, 120-5, and 120-6 included in the control-subject group and the flags indicating "unexecuted", "normally ended", and "abended" as the state of the active program processed at the nodes 120-1 to 120-6.

At step (S3), the active program creation portion 113 selects a node 120 having an "unexecuted" state of the active program processing from the circulation path which is set on the basis of the control-subject address table of the active program AP1, to transmit the active program AP1 to this node 120 through the control network 150.

The following will describe a case where, hereafter, the circulation path was set for the nodes 120-1, 120-2, 120-3, 120-4, 120-5, and 120-6 in this order, so as to transmit the active program AP1 from the active program creation portion 113 to the node 120-1.

At step (S4), the active program processing portion 121-1 of the node 120-1 executes the active program APT it has received. First, the it decides whether a processing table stored in the processing table storage portion 123-1 of the packet processing portion 122-2 can be changed into a control parameter specified by the active program AP1 and, if it can, changes the processing table, thus controlling the packet processing portion 122-2. A control conducting result is recorded in a field of the active program processing state in the control-subject address table in the active program AP1 as "normally ended" when control succeeded or "abended" if control failed due to any reason. A change in this processing table is immediately reflected in control of the packet processing portion 122-1.

At step (S5), the active program processing portion 121-1 decides the execution result of the active program AP1 based on the active program processing state recorded in the control-subject address table. If it is "normally ended", the process goes to step (s6). If it is "abended", it goes to step (S8).

At step (S6), the active program processing portion 121-1 at the node 120-1 determines a next "unexecuted" node 120, for example, node 120-2 from the circulation path set on the basis of the control-subject address table of the active program AP1, to transmit the active program AP1 through the control network 150.

At step (S7), the active program processing portion 121-1 at the node 120-1 determines a transmission result of the active program AP1 at step (S6).

When the active program AP1 has been transmitted to the next "unexecuted" node 120-2 completely, it is decided that circulation has not ended yet, so that at this next node 120-2 the processing of steps (S4) through (S7) is executed again. The similar processing is repeated along the circulation path at the nodes 120-3, . . . , 120-5.

If the node 120-6 is engaged in execution of the processing, there is no next "unexecuted" node 120 left any more because the node 120-6 is set last in the circulation path, so that it is impossible to select the next "unexecuted state" node 120 and transmit the active program AP1, thus permitting here deciding an end of the circulation and going to step (S8).

As described above, if the execution result of the active program AP1 at any one of the nodes 120 is decided to be "abended" at step (S5) or if circulation of the active program AP1 is decided to be ended at step (S7), at step (S8) the active program processing portion 121-6 of the relevant node 120, for example, the node 120-6 transmits the active program AP1 through the control network 150 to the EMS110.

At step (S9), based on the active program processing state recorded in the control-subject address table of the active program AP1, the active program creation portion 113 posts the execution result of the control processing to the management function portion 112, to end the control processing.

Note here that although not shown in the flowchart of FIG. 4, the management function portion 112 decides control by use of the active program AP1 over the node 120 succeeded if "normally ended" was posted at step (S9) of the active program processing state at all the nodes 120 of the control-subject group.

If, conversely, the active program processing state was "abended" at any given node 120 and the subsequent nodes 120 came up with "unexecuted" as the active program processing state, the management function portion 112 decides that control by use of the active program AP1 over the node 120 failed. Then, generally to cancel control by use of the active program AP1 over the node 120, the process transmits to the nodes 120 which came up with "abended" such a new active program that would return the processing table of the processing table storage portion 123 to its state before it was changed by the active program AP1.

By this control method according to the first embodiment, by controlling the node 120, which is a communication control apparatus, by means of circulation of the active program AP, it is possible to realize with a simple function the interconnection of the communication control apparatus and the EM110, which is a network management system. Further, by the configuration of this embodiment, if control over any communication control apparatus failed, the circulation of the active program AP is stopped immediately, so that such an effect can be provided that prevents the communication control apparatus from performing waste processing of circulating the active program AP through all the communication control apparatuses even if any one of them failed in changing the control mode.

Second Embodiment

The following will describe a configuration of a second embodiment of the present invention. The network configuration and the basic operations and configuration of its components are the same as those of the first embodiment shown in FIG. 1. A first active program AP2-1, however, serves to change the control setting of the node 120, while a second active program AP2-2 serves to start control whose setting is changed by the first active program AP2-1 and collect a result of conducting the control. Each of the processing table storage portions 123-1 to 123-6 of the nodes 120-1 to 120-6 can hold the first processing table in the "operation state" and the second processing table in the "standby state" used in practical control of the packet processing portions 122-2 to 122-6 respectively and switch in use the "operation state" and the "standby state" of these first and second processing tables from each other in configuration.

This control method of this second embodiment features a processing procedure that the activity program AP is circulated in two times, so that the first circulation involves creating the second processing table at a node 120 which is conducted on the basis of the first processing table in the "operation state" and holding it in the "standby state" and the second circulation involves switching the second processing table held in the "operation state" into the "operation state" in place of the first processing table.

This processing procedure may be outlined as follows.

If control needs to be conducted on a group of a predetermined node 120 in the IP network in order to perform a predetermined function, that is, to change the control mode, first the EMS110 creates the first active program AP2-1 which stores a control-subject address table of that group and the control contents and transfers it through the control network 150. Based on the control-subject address table in the first active program AP2-1, each node 120 decides whether itself belongs to the control-subject group and, if not, transfers this first active program AP2-1 to the relevant node 120 based on the control-subject address table of the first active program AP2-1. If it belongs, it executes the first active program AP2-1 it has received.

The node 120, after executing the first active program AP2-1, decides according to the first active program AP2-1 whether the first processing table in the "operation state" can be changed and, if possible, creates and holds a second processing table in the standby state", besides the first processing table in the "operation state", in the processing table storage portion 123.

The node 120, after executing the first active program AP2-1, records normal ending, if creation of the second processing table normally ended, of the "standby state" in the control-subject address table of the first active program AP2-1 and also, based on this control-subject address table, transmits the first active program AP2-1 to a node 120 of an "unexecuted" state in the control-subject group.

If the first active program AP2-1 abended, on the other hand, it records abending in the control-subject address table of the active program AP2-1 and also transmits the first active program AP2-1 to the EMS110, thus suspending the control processing.

When circulation has completed through all the nodes 120 belonging to the control-subject group, the first active program AP2-1 transmits is transmitted to the EMS110 to notifies it of a processing result.

Next, the EMS110 creates the control-subject table of the above-mentioned group and a second active program AP2-2 which stores a directive for switching the second processing table from the "standby state" to the "operation state" and transfers it through the control network 150 like in the case of the first active program AP2-1. Then, a node 120 belonging to the control-subject group executes the active program AP2-2 it has received.

The node 120, after executing the second active program AP2-2, performs processing for switching the second processing table held in the processing table storage portion 123 from the standby state" to the "operation state" and, if the processing normally ended, records normal ending in the control-subject address table of the second active program AP2-2 and also, based on this control-subject address table, transmits the second active program AP2-2 to an "unexecuted state" node 120 in the control-subject group.

If the second active program AP2-2 abended, on the other hand, it records abending in the control-subject address table of the second active program AP2-2 and also transmits the second active program AP2-2 to the EMS110, thus suspending the control processing.

When circulation has completed through all the nodes 120 belonging to the control-subject group, the second active program AP2-2 is transmitted to the EMS110 to notifies it of a processing result.

Next, the above-mentioned control procedure is detailed with reference to the flowchart of FIG. 6.

First, at step (S1), the management function portion 112 posts a predetermined control parameter to the active program creation portion 113 in order to control performance of a predetermined function at a predetermined node 120. The active program creation portion 113 creates a first active program AP1 corresponding to this control and integrates the control parameter posted from the management function portion 112 into the first active program AP1.

At step (S2), the active program creation portion 113 references the node address table 111 to extract an node address of each node included in the control-subject group posted from the management function portion 112 to then integrates a list of thus extracted node addresses as a control-subject address table into the first active program AP2-1 and sets it as a circulation path. Note here that the control-subject address table of this first active program AP2-1 stores, like in the case of the active program AP1 of the first embodiment, correspondence such as shown in FIG. 5 between the IP addresses of the nodes 120-1 to 120-6 included in the control-subject group and the flags indicating the active program processing states of the nodes 120-1 to 120-6 such as "unexecuted", "normally ended", and "abended".

At step (S3), the active program creation portion 113 selects a node 120 of an "unexecuted" state of the active program processing from the circulation path which is set on the basis of the control-subject address table of the first active program AP2-1 and transmits the first active program AP2-1 through the control network 150 to this node 120.

The following will describe an example where the circulation path was set for the nodes 120-1, 120-2, 120-3, 120-4, 120-5, and 120-6 in this order to transmit the first active program AP2-1 from the active program creation portion 113 to the node 120-1.

At step (S4), the active program processing portion 121-1 of the node 120-1 executes the first active program AP2-1 it has received. First, it decides whether the first processing table of the "operation state" held in the processing table storage portion 123 of the packet processing portion 122-1 can be changed into a control parameter specified by the active program AP1 and, if possible, creates and holds a second processing table in the "standby state", besides the first processing table in the "operation state", in the processing table storage portion 123. The result of executing this control is recorded in a first of the active program processing state of the control-subject address table as "normally ended" when control succeeded and "abended" if it failed due to any reason. Note here that the creation of this second processing table has no influence on the control of the packet processing portion 122-1 at this point in time, thus permitting the packet processing portion 122-1 to continue control based on the first processing table.

At step (S5), the active program processing portion 121-1 decides the execution result of the first active program AP2-1 based on an active program processing state recorded in the control-subject address table. In the case of "normally ended", the process goes to step (S6) and, in the case of "abended", goes to step (S8).

At step (S6), the active program processing portion 121-1 of the node 120-1 determines a next "unexecuted state" node 120, for example, a node 120-2 from the circulation path which is set on the basis of the control-subject address table of the first active program AP2-1 and then transmits the first active program AP2-1 through the control network 150.

At step (S7), the active program processing portion 121-1 of the node 120-1 decides a transmission result of the first active program AP2-1 at step (S6).

If the first active program AP2-1 has been transmitted to the next (unexecuted state" node 120-2 completely, circulation is decided not to be ended, so that the processing of steps (S4) through (S7) is executed again at this next node 120-2. The similar processing is repeated along the circulation path at the nodes 120-3 to 120-5. If the node 120-65 is engaged in execution, there is no next "unexecuted state" node 120 which is set last in the circulation path, so that it is impossible to select the next "unexecuted state" node 120 and transmit the first active program AP2-1 and a circulation end is decided, to thus making a shift to step (S8).

If "abended" is decided as the execution result of the first active program AP2-1 at any node 120 at step (S5) as described above or it is decided at step (S7) that the circulation of the first active program AP2-1 has been completed, at step (S8) the active program processing portion 121-6 of the corresponding node 120, for example, the node 120-6 transmits the first active program AP2-1 through the control network 150 to the EMS110.

At step (S9), based on the active program processing state recorded in the control-subject address table of the first active program AP2-1, the active program creation portion 113 posts an execution result of the control processing to the management function portion 112.

At step (S10), the management function portion 112 decides an execution standby result of the first active program AP2-1. If the active program processing state has been "normally ended" at all the nodes 120 in the control-subject group, it decides successful control of the node 120 which used the first active program AP2-1 and goes to step (s11).

If the active program processing state has been "abended" at any one of the nodes 120 and any subsequent node 120 in the circulation path come with an "unexecuted" state of the active program processing, on the other hand, it decides failed control of the node 120 which used the first active program AP2-1, thus ending the processing.

Next, at step (S11), the management function portion 112 posts a predetermined control parameter to the active program creation portion 113 in order to issue a directive for switching the second processing table created in the processing table storage portion 123 by the above-mentioned first active program AP2-1 from the "standby state" to the "operation state". The active program creation portion 113 creates a second active program AP2-2 which corresponds to the above-mentioned control and integrates into this second active program AP2-2 the control parameter posted from the management function portion 112.

At step (S12), the active program creation portion 113 references the node address table 111 to thereby extract the node address of each node included in a control-subject group posted from the management function portion 112 and integrates a list of thus extracted node addresses as a control-subject address table into the second active program AP2-2 and sets it as a circulation path. Note here that the configuration of the control-subject address table of this second active program AP2-2 is the same as that of the control-subject address table of the first active program AP2-1 and so is omitted in description here.

At step (S13), the active program creation portion 113 selects a node 120 in an "unexecuted" state of active program processing from the circulation path which is set on the basis of the control-subject address table of the second active program AP2-2 and transmits the first active program AP2-1 through the control network 150 to this node 120.

The following will describe an example where hereafter the circulation path was set at the nodes 120-1, 120-2, 120-3, 120-4, 120-5, and 120-6 in this order to transmit the first active program AP2-1 from the active program creation portion 113 to the node 120-1.

At step (S14), the active program creation portion 121-1 of the node 120-1 executes the second active program AP2-2 it has received. First, it switches the second processing table held in the processing table storage portion 123 of the packet processing portion 122-1 from the "standby state" to the "operation mode" and records "normally ended" if the switching succeeded and "abended" if it failed due to any reason in a field of the active program processing state in the control-subject address table in the second active program AP2-2. Note here that this switching of the processing table is immediately reflected in control of the packet processing portion 122-2 to thereby update the control mode.

At step (S15), the active program processing portion 121-1 decides an execution result of the second active program AP2-2 based on an active program processing state recorded in the control-subject address table. In the case of "normally ended", the process goes to step (S16). In the case of "abended", the process goes to step (S18).

At step (S16), the active program processing portion 121-1 of the node 120-1 determines a next "unexecuted state" node 120, for example, a node 120-2 from the circulation path which is set on the basis of the control-subject address table of the second active program AP2-2 and transmits the second active program AP2-2 through the control network 150.

At step (S17), the active program processing portion 121-1 of the node 120-1 decides a transmission result of the second active program AP2-2 at step (S16).

When the second active program AP2-2 has been transmitted to the next "unexecuted state" node 120-2 completely, the process decides that the circulation is yet to be ended and executes the processing of steps (S14) through (S17) at this next node 120-2. The similar processing is then repeated along the circulation path at the nodes 120-3 to 120-5. If the node 120-6 is engaged in execution, the node 120-6 is set last in the circulation path and so there is no next node 120 left in the "unexecuted state", so that the process cannot select the next "unexecuted state" node 120 and transmit the second active program AP2-2 to thereby decide that the circulation ended, thus going to step (S18).

Then, as mentioned above, if it is decided that the execution of the second active program AP2-2 at any one of the nodes 120 "abended" at step (S15) or that the circulation of the second active program AP2-2 ended at step (S17), at step (S18) the active program processing portion 121-6 of the relevant node 120, for example, the node 120-6 transmits the second active program AP2-2 through the control network 150 to the EMS110.

At step (S19), the active program creation portion 113 posts an execution result of the control processing to the management function portion 112 based on the active program processing state recorded in the control-subject address table of the second active program AP2-2, thus ending the control processing.

Figure 6:
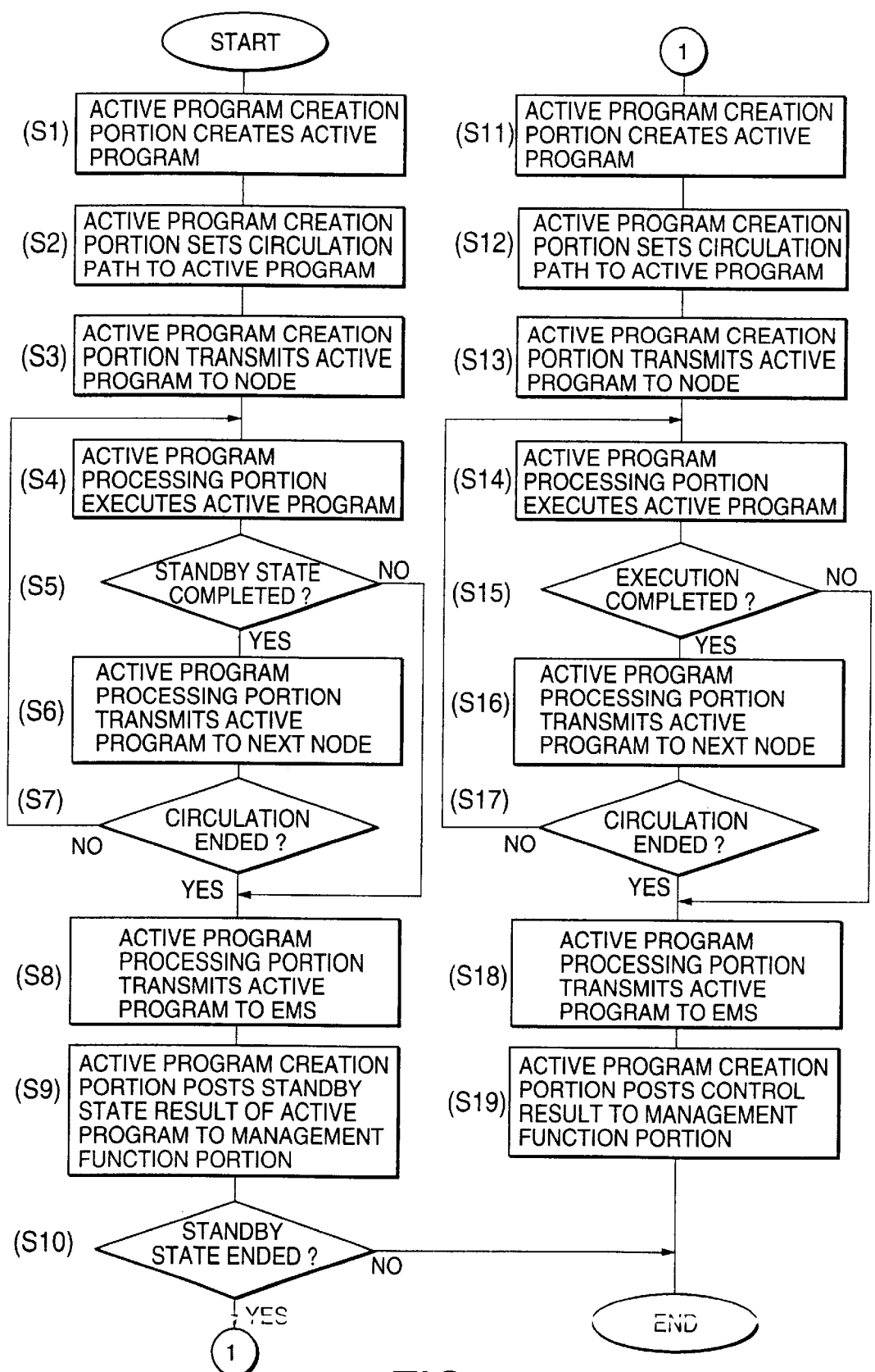
FIG. 6 is a flowchart for showing details of a control procedure of a second embodiment.

Note here that although not shown in the flowchart of FIG. 6, the management function portion 112 decides that control of the node 120 which used the first active program AP2-1 and the second active program AP2-2 succeeded if the active program processing state came up with "normally ended" at all the nodes 120 in the control-subject group.

If any node 120 came up with an "abended" state of the active program processing in the first active program AP2-1 or the second active program AP2-2 and any subsequent node 120 in the circulation path came up with an "unexecuted" state of the active program processing, on the other hand, the process decides that control of the node 120 which used the first active program AP2-1 and the second active program AP2-2 failed. Then, in order to cancel the second processing table in the "standby state" or return the second processing table in the "operation state" to the first processing table, the process transmits a new active program to a node 120 at which the first active program AP2-1 or the second active program AP2-2 "normally ended".

By this control method of the second embodiment, the circulation of the active program is performed in two times, so that the first circulation involves creating the second processing table in the "standby node" at the node 120 and the second circulation involves switching the second processing table held in the "standby state" to the "operation state", so that it is possible to decides at the first circulation of the active program AP the permission/refusal of the control processing before the switching is actually made.

The processing involved in the second circulation of the active program AP, on the other hand, acts only to switch the second processing table held in the "standby state" to the "operation state", thus taking only short time in execution at each node 120. Accordingly, the second circulation involving the switching processing can be reduced in execution time by far as compared with the first circulation.

As a result, only a small time lag is required between the completion of the switching of a node 120 located at the start of the circulation path and that of a node 120 located at the end thereof, thus enabling relatively well synchronized control of the nodes 120.

Third Embodiment

The following will describe a third embodiment of the present invention.

There is a difference between the above-mentioned first and second embodiments in a respect whether specific control is conducted by circulating the active program once or twice in the UP network. As may be clear from the flowchart of FIG. 6, the control method according to the second embodiment of circulating the active program twice has a configuration in which essentially the same steps are repeated except for such contents of the execution of the active program AP at the active program processing portion 121 of the node 120 as shown at steps (S4) and (S14).

Such a configuration that conducts specific control by circulating the active program twice or more in the IP network is not limited to a scheme of circulating it twice but may be of a scheme of circulating it three time or more in conducting of control. This third embodiment involves circulating the active program three time in conducting of specific control, having almost the same network configuration and basic operations and configuration of each component thereof as those of the second embodiment.

In the third embodiment, a first active program AP3-1 serves to decides permission/refusal of execution of a second active program AP3-2, the second active program AP3-2 serves to change the setting of control of the node 120, and a third active program AP3-3 serves to starts control whose setting is changed by the second active program AP3-2 and collect an execution result.

A control method of the third embodiment features a processing procedure that the active program AP is circulated in three times, so that first circulation involves deciding whether the node 120 controlled on the basis of the first processing table in the "operation state" can be controlled on the basis of a second processing table, the second circulation involves creating this second processing table and holding it in the "standby state", and the third circulation involves switching the second processing table held in the "standby state" to the "operation state" in place of the first processing table.

This processing procedure may be outlined as follows.

If it needs to conduct control over a predetermined group of nodes 120 in the IP network in order to perform a predetermined function, first the EMS110 creates the first active program AP3-1 which stores a control-subject address table of that group and a directive for deciding permission/refusal of the execution of the control contents and then transfers it as the first circulation through the control network 150. Based on the control-subject address table in the first active program AP3-1, each node 120 decides whether itself belongs to the control-subject group and, if not, transfers this first active program APS3-1 to the relevant node 120 based on the control-subject address table of the first active program AP3-1. If it belongs, it executes the first active program AP3-1 it has received.

After executing the first active program APS3-1, according to the first active program AP3-1 the node 120 decides whether the first processing table in the "operation state" held in the processing table storage portion 123 can be changed and, if possible, records normal ending of the execution permission/refusal decision in the control-subject address table of the first active program AP2-1 and also, based on this control-subject address table, transmits the first active program AP3-1 to an "unexecuted state" node 120 in the control-subject group.

If it is decided that that first processing table cannot be changed, on the other hand, the node 120 records abending of the execution permission/refusal in the control-subject address table of the active program AP3-1 and also transmits the first active program AP3-1 to the EMS110, thus suspending the control processing.

When circulation has been completed through all the nodes 120 belonging to the control-subject group, the first active program AP3-1 is transmitted to the EMS110 to notifies it of a processing result.

In this processing of the first circulation, as described above, the second and third circulation steps also are the same in processing procedure as the first circulation step except for the execution contents of the active program at the node 120, only which contents are therefore described below.

That is, the second active program AP3-2 circulated for the second time stores the control-subject address table of the above-mentioned control-subject group and the control contents, so that a node 120 which has executed the second active program APS3-2 creates and holds in the processing table storage portion 123 a second processing table in the "standby state", besides the first processing table currently in the "operating state".

The third active program APS303 circulated for the third time, on the other hand, stores the control-subject address table of the above-mentioned control-subject group and a directive for switching the second processing table in the "standby state" to the "operation state", so that a node 120 which has executed the third active program AP3-3 executes processing for switching the third processing table in the "standby state" held in the processing table storage portion 123 to the "operation state".

Figure 7:
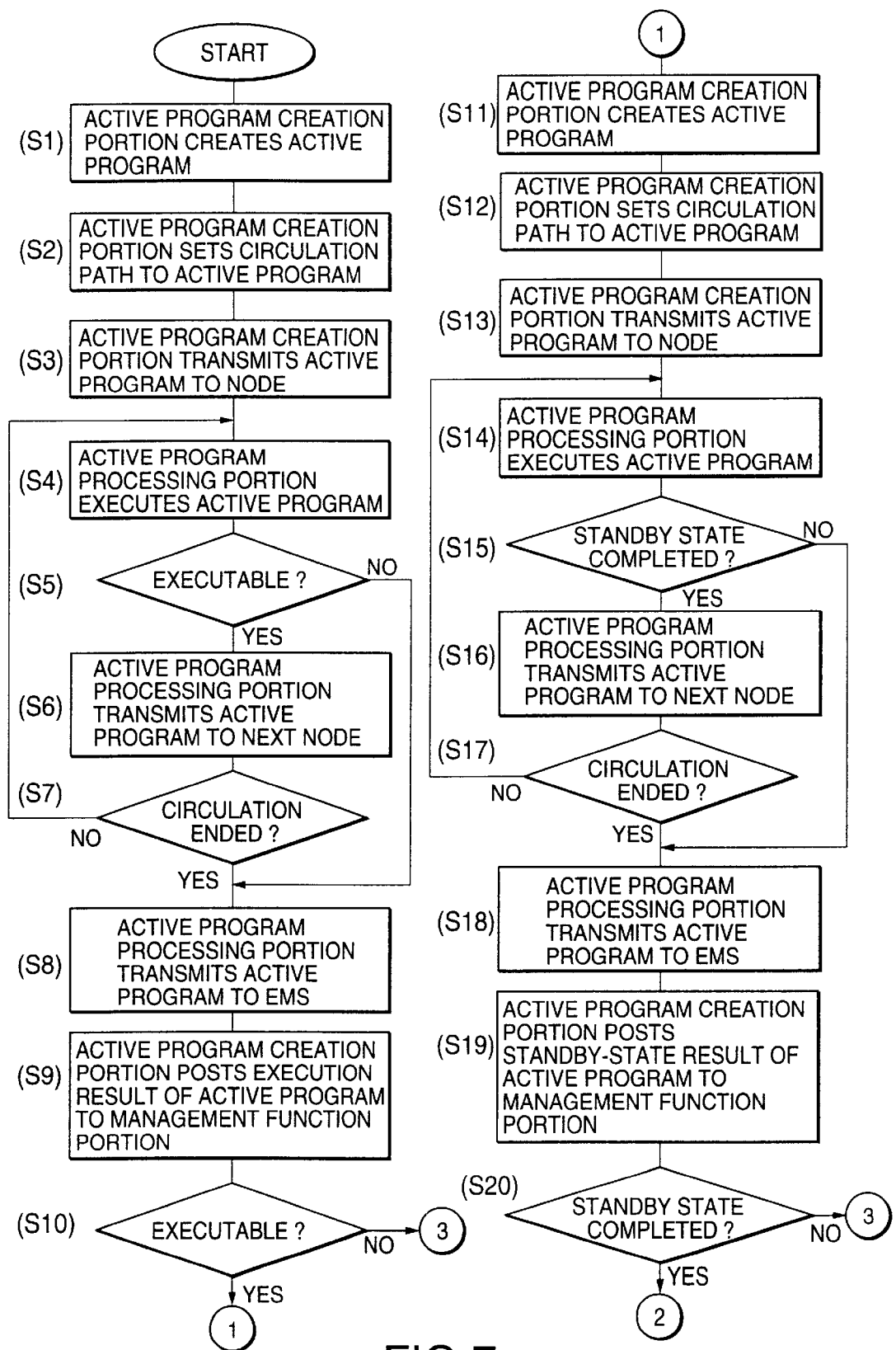
FIG. 7 is a first flowchart for showing details of a control procedure of a third embodiment.
Figure 8:
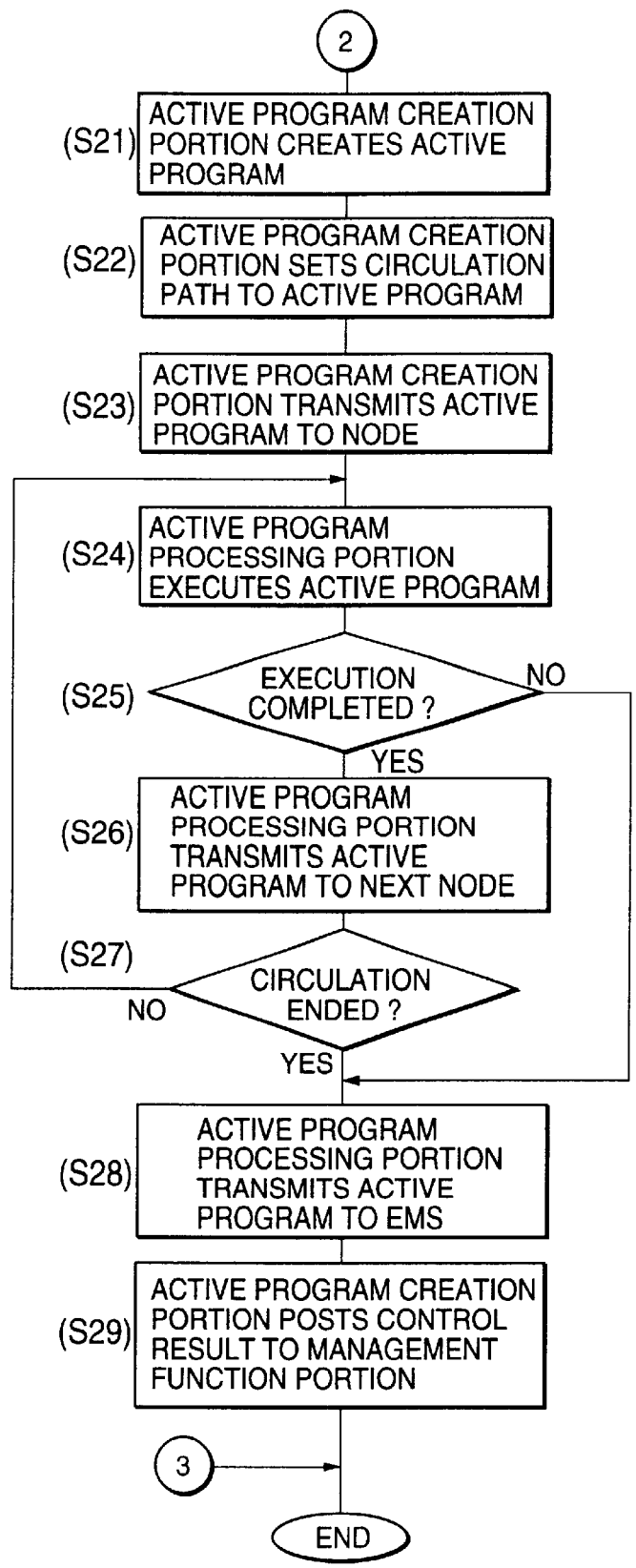
FIG. 8 is a second flow chart for showing the details of the control procedure of the third embodiment.

This control procedure is detailed in a flowchart shown FIGS. 7 and 8.

As shown in the flowchart comprised of steps (S1) through (S29) and may be clear from its description and the above explanation, processing of steps (S1) through (S10) corresponds to the first circulation by the first active program AP3-1, processing of steps (S11) through (S20) corresponds to the second circulation by the second active program AP3-2, and processing of steps (s21) through (S29) corresponds to the third circulation by the third active program AP-3.

As can be seen from comparison to the flowchart of FIG. 6 comprised of steps (S1) through (S19) of the second embodiment, the processing of steps (S1) through (S1) and the processing of steps (S11) through (S20) are the same as the processing of steps (S1) through (S10) of the second embodiment except that the execution contents of the active program at steps (S4) and (S14) are different from that of step (S4) of the second embodiment. Moreover, the processing of steps (s21) through (S29) is essentially the same as that of steps (S11) through (s19) of the second embodiment.

Therefore, only the control procedure for steps (S4) and (s14) is detailed, thus outlining the other steps.

First, like at steps (S1) through (S3) of the second embodiment, the processing of steps (S1) through (S3) creates the first active program AP3-1 and transmits it to the node 120.

At step (S4), the active program processing portion 121-1 of the node 120-1 executes the active program AP3-1 it has received to thereby decide whether the active program AP3-2 can be executed in the node 120-1.

At step (S4) the active program processing portion 121-1 of the node 120-1 executes the first active program AP3-1 it has received. That is, the process decides whether the first processing table in the "operation state" held in the processing table storage portion 123 of the packet processing portion 122-1 can be changed into a control parameter specified by the first active program APS3-1 and, if possible, records "normally ended" and, if impossible due to any reason, "abended" in a field of the active program processing state in the control-subject address table in the first active program AP2-1. Note here that this decision for possible/impossible of changing has no influence on the control of the current packet processing portion 122-1, thus permitting the packet processing portion 122-1 to continue control based on the first processing table.

Then, at steps (S5) through (S10), almost the same processing as that of steps (s5) through (S10) of the second embodiment is executed, so that if it decides that control of the node 120 which used the first active program AP3-1 succeeded, the process goes to step (S11).

Next, at steps (S11) through (S13), like at steps (S1) through (S3) of the second embodiment, the process creates the second active program AP3-2 and transmits it to the node 120.

At step (S14), the active program processing portion 121-1 of the node 120-1 executes the second active program AP3-2 it has received. That is, besides the first processing table in the "operation state", a second processing table in the "standby state" is created and held in the processing table storage portion 123. This control execution result is recorded as "normally ended" of control succeeded and "abended" if it failed due to any reason in a field of the active program processing state in the control-subject address table in the first active program AP2-1. Note here that the creation of this second processing table has no influence on control of the packet processing portion 122-1 currently, thus permitting the packet processing portion 122-1 to continue control based on the first processing table.

Then, at steps (S15) through (S20), almost the same processing as that of steps (S5) through (S10) of the second embodiment is executed, so that the process goes to step (S21) if it decides that control of the node 120 which used the second active program AP3-2 succeeded.

At last, at steps (S21) through (S29), like at steps (S10) through (S10) of the second embodiment, the process creates a third active program AP3-3 and transmits it to the node 120 to thereby switch the second processing table held in the "standby" state to the "operation state", thus ending the control processing.

By such a third control method of the third embodiment, the circulation of the active program AP can be divided into three steps of "execution decision", "execution preparation", and "execution start" to enable, like by the second embodiment, not only controlling the relatively synchronized nodes 120 but also specially deciding whether this control is possible to conduct before actually executing processing for creating the second processing table in the "standby state", so that if impossibility of control is decided, it is possible to avoid inflicting extra processing on each node 120.

Although in this configuration if execution of the second active program AP3-2 is decided to be impossible at any given node 120, the first active program AP3-1 in this third embodiment does not decide whether it is possible at the subsequent nodes 120, thus suspending the control processing, such a configuration is possible that even when changing is decided to be impossible at some of the nodes 120, it is possible to decide whether the execution is possible at all the nodes 120 in the control-subject address table. If, in this configuration, changing is possible at any given node 120, it is possible to send, in configuration, such a second active program that excluded that node 120 from the control-subject group and also to send such a second active program that can be executed even at that node 120.

Fourth Embodiment

The following will describe a configuration of a fourth embodiment. The network configuration of this fourth embodiment and the basic operations and configuration of components thereof are the same as those of the first embodiment.

By a configuration of a control method of this fourth embodiment, to control the node 120, an active program AP4 is circulated as packet-format data once through the control network 150, with a difference from the first embodiment that if the active program AP4 abended in execution at a specific node 120, the process goes along the circulation path in a reverse direction to thereby execute error recovery processing.

This processing procedure may be outlined below.

If it needs to control a predetermined group of nodes 120 in the IP network in order to perform a predetermined function, the EMS110 creates an active program AP4 which stores a control-subject address table for that group, processing contents corresponding to performance of this predetermined function, and processing contents of the error recovery processing and then transfers it through the control network 150. Based on the control-subject address table in the active program AP4, each node 120 decides whether itself belongs to the control-subject group and, if not, transfers this active program AP to a relevant node 120 based on the control-subject address table of the active program AP. If it belongs, it executes the active program AP4 it has received to thereby conduct communication control.

The node 120 which has executed the active program AP4 records normal ending, if this active program AP4 normally ended, in the control-subject address table of the active program AP4 and also, based on this control-subject address table, transmits the active program AP4 to an "unexecuted state" node 120 in the control-subject group.

When the circulation is completed through all the nodes 120 belonging to the control-subject group, the active program AP4 is transmitted to the EMS110 to notify it of a processing result.

If the active program AP4 abended in execution at any given node 120, the process records abending in the control-subject address table of the active program AP4, which in turn suspends control processing to switch its own processing contents to the error recovery processing. Then, the active program AP4 goes along the circulation path backward to the node where the program abended which is recorded in the control-subject address table of the active program AP4, to execute at each node 120 the error recovery processing, that is, the processing for returning the control processing executed by the active program AP4 to its original state. When the error recovery processing is completed up to the top node 120 in the circulation path, this node 120 transmits the active program AP4 to the EMS110 to post an execution result of the active program AP4.

Figure 9:
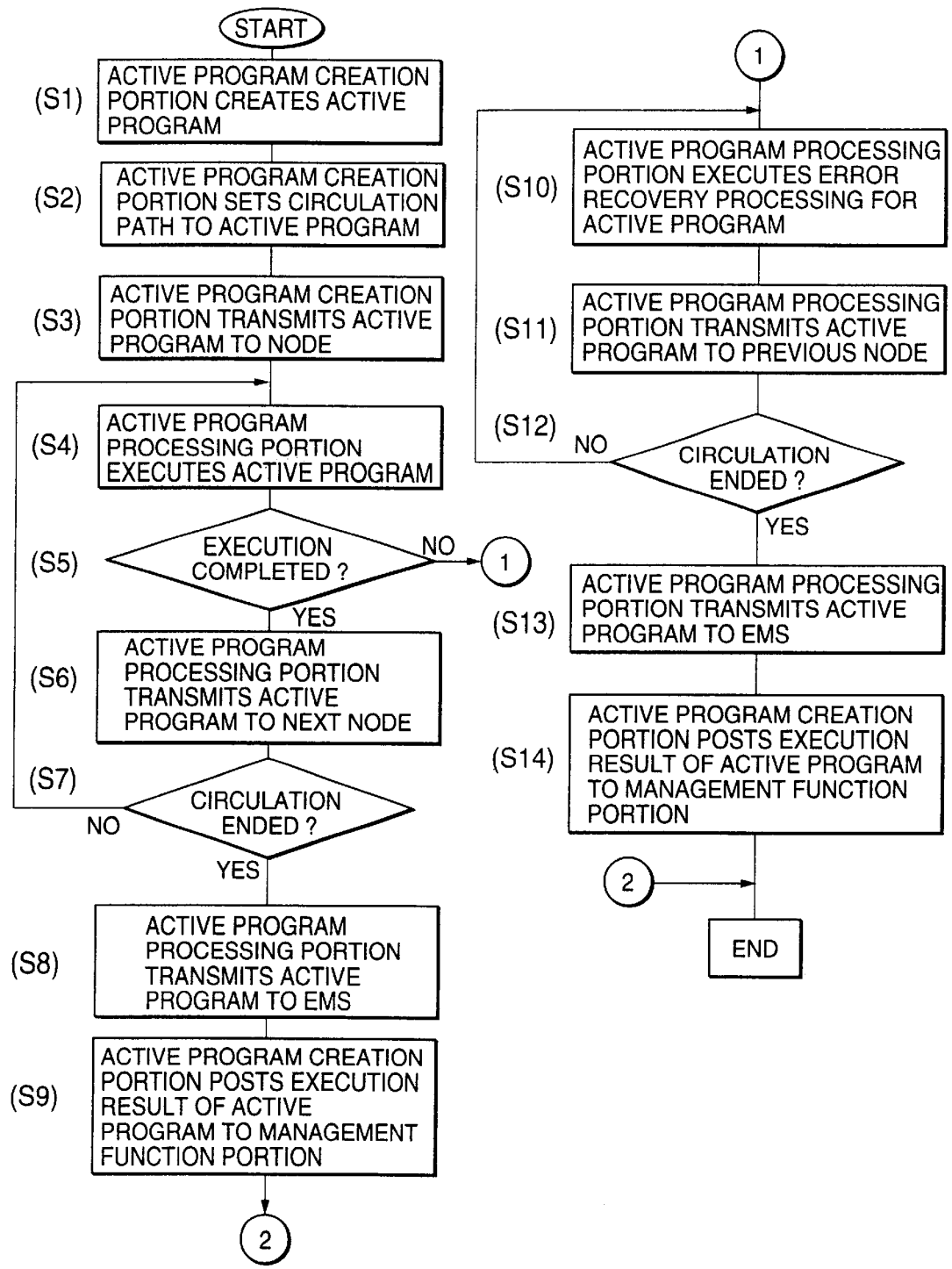
FIG. 9 is a flowchart for showing details of a control procedure of a fourth embodiment.

FIG. 9 is a flowchart for showing the details of this control procedure.

As may be clear from this flowchart comprised of steps (S1) through (S14) and the above description, processing of steps (S1) through (S9) corresponds to the processing related to original control by the active program AP4 and that of steps (S10) through (S14), to the error recovery processing by the active program AP4.

Furthermore as can be seen from comparison to the flowchart comprised of steps (S1) through (S9) of the first embodiment shown in FIG. 4, the processing of steps (S1) through (S9) and that of steps (S1) through (S19) of the first embodiment are the essentially same as each other except for a jump destination in a case where an execution result of the active program AP4 is decided "abended" at step (S5).

Therefore, the control procedure of only steps (S5) and (S10) through (s14) are detailed below, leaving the other steps as outlined.

First, like at steps (S1) through (s4) of the first embodiment, at steps (S1) through (S4) of this embodiment, active program AP4 is created and transmitted to the node 120-1. Then, if control by the active program A4 succeeded, "normally ended" is given and, if control failed due to any reason, "abended" is given.

At step (S5), the active program processing portion 121-1 decides an execution result of the active program AP4 based on the active program processing state recorded in the control-subject address table. In the case of "normally ended", the process goes to step (S6). In the case of "abended", it goes to step (S10).

In the case of "normally ended", specifically, at steps (S6) through (S9), the process executes almost the same processing as that of steps (S6) through (S9) of the first embodiment, to post successful control processing to the management function portion 112, thus ending the control processing.

If "abended" is given at step (S5), on the other hand, the processing of step (S10) and the subsequent is executed as follows.

First, at step (S10), the active program processing portion 121 engaged in the execution of the active program AP4 executes the error recovery processing on the active program AP4. An execution result of the error recovery processing is recorded as an active program processing state in the control-subject address table in the active program AP4.

At step (S11), the active program processing portion 121 determines a previous node 120 from a hitherto circulation path recorded in the active program AP4 and transmits it to the active program AP4.

At step (S12), the active program processing portion 121 decides a transmission result of the active program AP4 given at step (S11).

If any previous node 120 exists and when the active program AP4 is transmitted to this node 120 completely, the process decides that the circulation is not ended yet, to execute processing of steps (S10) through (s12) again at this previous node 120. If this node 120 engaged in execution happens to be the top of the past circulation path, there is no previous node any more, so that is it impossible to select the previous node 120 and transmit the active program AP4 to thereby decide that the circulation has ended at this point in time, thus going to step (S13).

If it is decided at step (S12) that the circulation of the first active program AP2-1 is completed, the active program processing portion 121 of a relevant node 120 transmits the active program AP4 through the control network 150 to the EMS110 at step (S13).

At step (S4), the active program creation portion 113 posts an active program processing state recorded in the control-subject address table of the active program AP4, that is, an execution result of the control processing and that of the error recovery processing to the management function portion 112, thus ending the control processing.

In the configuration of such a control method according to the fourth embodiment, if a control error occurs as a result of execution of a specific active program, this active program itself executes the error recovery processing, so that there is no need to create and circulate a new active program for error recovery, thus enabling decreasing the overhead due to the circulation of the active program and also automatically executing the recovery processing rapidly.

Fifth Embodiment

The following will describe a configuration of a fifth embodiment. By a control method of this fifth embodiment, the node 120 is controlled by circulating an active program AP5 once. The difference from the first embodiment is that control is conducted on execution, stopping, restarting, and ending of the active program AP5 on the node 120 according to time conditions.

FIG. 10 is a table for explaining the time conditions used in control which are stored in the active program AP5. A format for displaying the time conditions shown in FIG. 10 is in accordance with a display format standardized by IETF, consisting of "value period", "valid month", "valid day", "valid day-of-the-week", and "valid time".

As shown in FIG. 10, the "valid period" is a character string given in a format of yyyymmddhmmss:yyyymmddhhmmss, thus indicating a valid period. yyyy indicates a four-digit Christian-era year, mm indicates a month (01–12), dd indicates a day of the month (01–31), hh indicates an hour of the day (00–23), mm indicates a minute of the hour (00–59), and ss indicates a second of the minute (00–59).

The "valid month" is a character string consisting of 12 "0"s and "1"s, of which the top digit indicates January. Here "0" indicates validity and "1", invalidity.

The "valid day" is a character string consisting of 31 "0"s and "1"s, of which the top digit indicates the first day of the month. Here "0" indicates validity and "1", invalidity.

The "valid day-of-the-week" is a character string consisting of seven "0"s and "1"s, of which the top digit indicates Monday. Here, "0"indicates validity and "1", invalidity.

The valid hour" is a character string expressed in a format of hhmmss:hhmmss, thus specifying a range of a valid time. hh indicates the hour-of-the-day (0–23), mm indicates the minute-of-the-hour (00–59), and ss indicates the second-of-the-minute (00–59). In the format, defaulted items are considered to be all valid. A time interval given by the time conditions are supposed to be a time derived by taking a logical product of these items.

For example, as for the time conditions, supposing that the "valid period" is specified to be 20010101000000:20010131235959 and the "valid day-of-the-week" is specified to be 0111110, from these specifications such time conditions can be derived that the interval is from 0:0:0 on Jan. 1st, 2001 to 213:59:59 on Jan. 31st, 2001 and from Monday to Friday.

A processing procedure for this embodiment may be outlined as follows.

First, if it needs to control a predetermined group of nodes 120 in the IP network for exerting a predetermined function, the EMS110 creates an active program AP5 which stores a control-subject address table for that group, the control contents, and the time conditions and then transfers it through the control network 150.

Based on the control-subject address table in the active program AP5, each of the nodes 120 decides whether itself belongs to the control-subject group and, if not, transfers this active program AP5 to a relevant node based on the control0subject address table of the active program AP5. If it belongs, on the other hand, it executes the active program AP5 it has received.

The node 120 which has executed the active program AP5 decides according to the active program AP5 whether a first processing table in the "operation state" held in the processing table storage portion 123 can be changed and, if it can be changed, creates besides the first processing table in the "operation state" a second processing table in the "standby state" in the processing table storage portion 123 and holds it together with the time conditions stored in the active program AP5.

The node 120 which has executed the active program AP5 records "normally ended", if the creation of the second processing table in the "standby state" and the setting of the time conditions ended normally, in the control-subject address table of the active program AP5 and also, based on this control-subject address table, transmits the active program AP5 to an "unexecuted state" node 120 in the control-subject group.

If the active program AP5 abended in execution, it records "abended" in the control-subject address table of the active program AP5 and also transmits the active program AP5 to the EMS110, thus suspending the control processing.

When circulation is completed through all the nodes 120 belonging to the control-subject group, the active program AP5 is transmitted to the MES110 to notify it of a processing result.

Then, the second processing table set by the active program AP5 to be executed in the node 120 is switched into the "operation state" as far as the simultaneously set time conditions hold true, thus causing control based on this second processing table to be conducted at a control-subject node 120.

Figure 11:
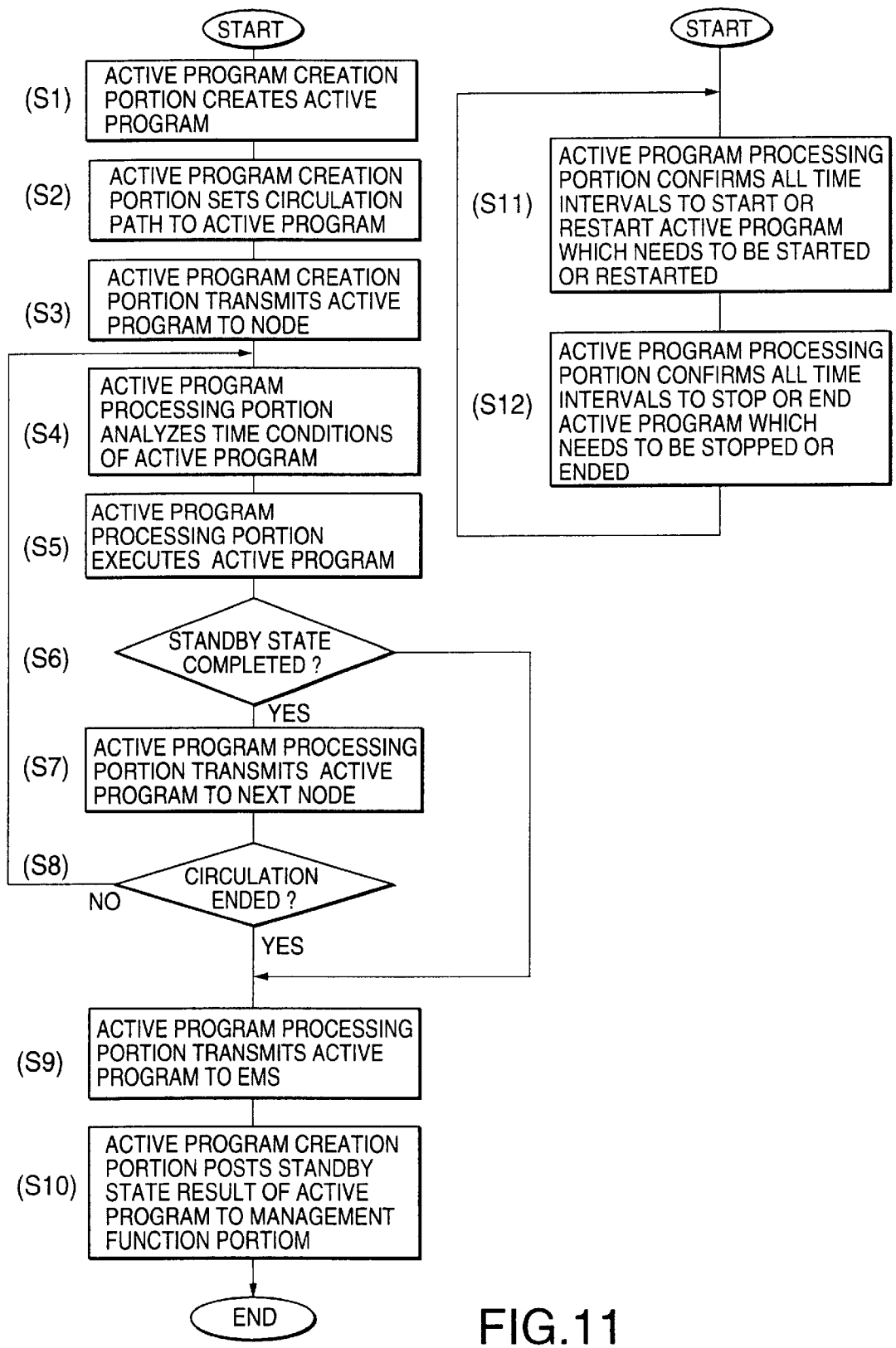
FIG. 11 is a flowchart for showing details of a control procedure of a sixth embodiment.

FIG. 11 is a flowchart for showing details of this control procedure.

As may be clear from this flowchart comprised of steps (S1) through (S12) and the above description, processing of steps (S1) through (S10) corresponds to the setting of control by the active program AP5 on the node 120 which set the time conditions and processing of (S11 (through (S12) corresponds to the control processing of the node 120 based on this control setting.

Furthermore, as may be seen from comparison to the flowchart comprised of steps (S1) through (S9) of the first embodiment shown in FIG. 4, the processing of steps (S1) through (S3) and that of steps (S6) through (S9) are essentially the same as that of steps (S1) through (S3) and that of steps (S6) through (S9) of the first embodiment respectively.

Therefore, here the control procedure only of steps (S4) through (S5) and steps (S11) through (S12) is described, leaving the other steps as outlined.

First, like steps (S1) through (S3) of the first embodiment, the active program AP5 including the time conditions in a control parameter is created and transmitted to the node 120 at steps (S1) through (S3).

At step (S4), the active program processing portion 121-1 of the node 120-1 reads out the time conditions from the active program AP5 to calculate a time interval for executing the active program AP5. The time interval is comprised of a starting time and an ending time, so that a plurality of the time intervals may be calculated depending on the time conditions which are set.

At step (S5), the active program processing portion 121-1 of the node 120-1 executes the active program AP5. First, the first processing table in the operation state" held in the processing table storage portion 123 of the packet processing portion 122-1 decides whether the control parameter specified by the active program AP5 can be changed and, if possible, creates and holds a second processing table in the processing table storage portion 123 besides this first processing table in the "operation state". A result of conducting this control is recorded in a field of the active program processing state in the control-subject address table in the active program AP5 as "normally ended" if control succeeded and "abended" if control failed due to any reason.

At steps (S6) through (S10), almost the same processing as that of steps (S5) through (S9) of the first embodiment is performed.

Concurrently with the circulation of the active program AP5 at the above-mentioned steps (S1) through (S6), the following processing is performed at a node 120 which created the second processing table in the "standby state" at steps (S4) through (S5).

At step (S11), the active program processing portion 121 confirms all the time intervals it holds to then switch into the "operation state" the second processing table which needs to be started or restarted, thus starting or restarting to conduct control according to this second processing table.

At step (S12), the active program processing portion 121 confirms all the time intervals it holds to then switch into the "standby state" the second processing table which needs to be stopped or ended, thus stopping or ending conducting of control in accordance with this second processing table. Then, the process goes to step (S11).

By this control method of the fifth embodiment, it is possible, at the node 120, to specify timing at which the second processing table is switched into the "operation state" by using the time conditions stored in the active program AP5, thus changing control as completely synchronized among a plurality of the nodes 120.

Further, it is possible to set the time conditions using such a display format as shown in FIG. 10 in such a way that a plurality of time intervals can be set in a single display format as, for example, from Monday to Friday in Jan. 1st on 2001 to Jan. 31st on 2001. As a result, it is possible for the active program AP5 itself to set such timing items as execution, stopping, restarting, and ending of conducting control in accordance with the second processing table which is set by the active program AP5, thus greatly reducing the traffic of the control network.

Note here that although in this embodiment only one processing table is set by the active program, a plurality of the active programs may be used in configuration to create a plurality of different processing tables and switch them according to the time conditions as far as it does not mismatch with the time conditions or the control contents.

Although in each of the above-mentioned embodiments, all the nodes 120-1, 120-2, 120-3, 120-4, and 120-5 of the IP network have been subject to control by the active program AP, the present invention is not limited to this configuration; for example, one or more of the nodes in the IP network may be controlled selectively, with no need for the EMS110 to directly transmit the active program AP to a control-subject node.

Since nodes to be controlled are specified in the active program's address table, any node not subject to control, if having received the active program, transfers the active program toward a control-subject node according to this address table.

Furthermore, although in the second and third embodiments the second and the subsequent circulation paths of the active program are set totally the same as that of the first circulation path of the active program, the path need not be the same each time as far as it circulates all the subject nodes.

In the configuration of the second and third embodiments, if it was impossible to switch into the "operation state" the second processing tables of all the change-subject nodes, such an active program is separately created that cancels the second processing table in the "standby state" which exists at a different node.

The present invention, however, is not limited to this configuration; for example, such a time-out processing configuration may be given that when a predetermined time lapse has elapsed in the "standby state", the node may make a decision by itself to cancel the second processing table in the "standby state".

Figure 12:
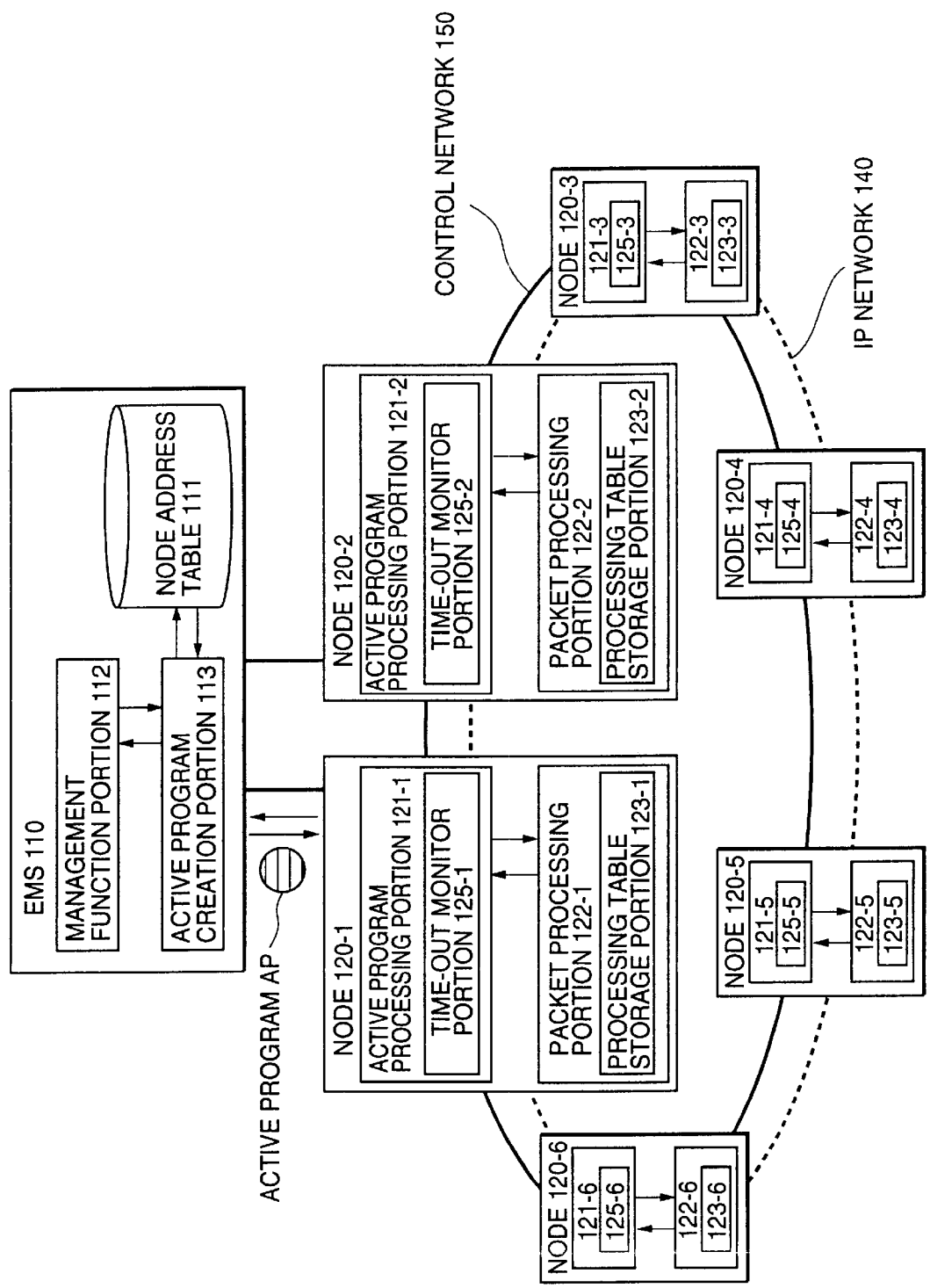
FIG. 12 is a block diagram for showing a configuration of an IP network in which an active program processing portion 124 at a node 120 is provided with a time-out monitor portion 125.

Such a configuration is shown in FIG. 12. In this figure, the same elements are indicated by the same reference numerals in FIG. 1, in such a configuration that features a respect that the nodes 120-1 to 120-6 are provided with time-out monitor portions 125-1 to 125-6 respectively.

Those time-out monitor portions 125-1 to 125-6 start counting time from a point in time when it is decided that the creation of the second processing table in the "standby state" by the active program "normally ended" (which corresponds to step (S5) of FIG. 6 or step (S15) of FIG. 7) and, if the further active program fails to switch the second processing table into the "operation state" (which corresponds to step (S14) of FIG. 6 or step (S24) of FIG. 8) even when a predetermined time lapse has elapsed, deletes the second processing table in the "standby state" which is held in the processing table storage portion 123.

Further, although in the above-mentioned embodiments, the active program is transmitted via the control network to each of the nodes 120, the present invention is not limited to this configuration; for example, the active program in a packet format may be transferred through the IP network for transferring IP packets, thus controlling each of the nodes 120.

Figure 13:
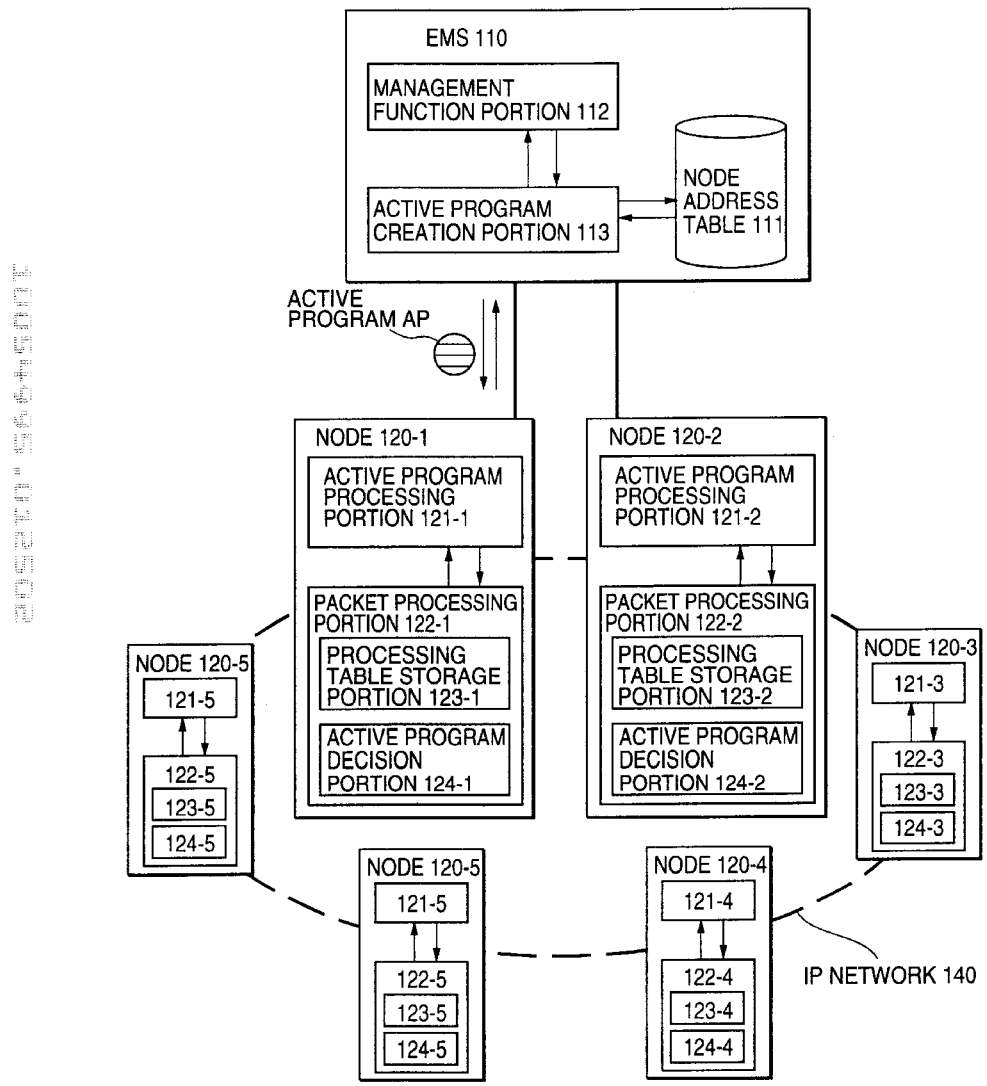
FIG. 13 is a block diagram for showing a configuration of an IP network in which a packet processing portion at node 120 is provided with an active program decision portion 121 and an active program is transmitted and received through a network 140.

Such a configuration is shown in FIG. 13. In this drawing, the same elements are indicated by the same reference numerals in the FIG. 1, in such a configuration that features a respect that the control network is not used to transfer the active program, and the packet processing portions 122-1 to 122-6 of the nodes 120-1 to 120-6 are not provided with active program decision portions 124-1 to 124-6, respectively.

Those active program decision portions 124-1 to 124-6 monitor the head of an IP packet processed at the packet processing portion 122, so that when a relevant node 120 decides that the packet is the active program destined for itself based on an application ID etc. added at the head, it sends that IP packet from the packet processing portion 122 to the active program processing portion 121. The active program thus sent to the active program processing portion 121 is processed much the same way as in the above-mentioned embodiments except that the IP network 140 is used to transmit the active program to a next "unexecuted state" node 120 or the EMS110.

Further, it is of course possible to combine a configuration given in the second and third embodiments for performing specific processing by circulating the active program a plurality of times and a configuration given in the fourth embodiment for permitting the active program itself to perform error recovery for a failure in processing by the activity program.

Furthermore, although in the above-mentioned embodiments, by changing the processing table of the node 120, its processing mode is changed in control configuration, the present invention is not limited to this configuration; for example, the processing mode may be changed by adding a new processing program.

As described above, by the present invention, the network management system creates an active program and circulates it through the network once or a plurality of times to thereby change in control the operation mode of the communication control apparatuses, thus enabling effectively conducting control with a small management load on the system.

What is claimed is:

1. A communication control apparatus controlling method, wherein when changing a control mode for a predetermined group among a later described plurality of communication control apparatuses in a network system having a plurality of interconnected communication control apparatuses and a network management system for managing said plurality of communication control apparatuses, said method comprising the steps of:
   a) permitting said network management system to create an active program which stores an address table of each communication control apparatus belonging to said group and an active program which stores contents of said control mode;
   b) permitting said network management system to transfer said active program to said group of communication control apparatuses according to said address table; and
   c) permitting any one of said group of communication control apparatuses which has received said active program to execute said active program to thereby change said control mode, in which:
      c-1) if changing of said control mode succeeded, a success is recorded in said address table and then, based on said address table, said active program is transmitted to such a communication control apparatus in said group that is yet to execute said active program; and
      c-2) if changing of said control mode failed, a failure is recorded in said address table and then, said active program is transmitted to said network management system.

2. The communication control apparatus controlling method according to claim 1, wherein said network system has a control network for managing said plurality of communication control apparatuses, in which said active program is transferred.

3. The communication control apparatus controlling method according to claim 1, wherein said plurality of communication control apparatuses has an active program decision portion for deciding whether data received through said network system is said active program, so that if said data is decided to be said active program, said active program is executed in active program processing.

4. A communication control apparatus controlling method, wherein when changing a control mode for a predetermined group among a later described plurality of communication control apparatuses in a network system having a plurality of interconnected communication control apparatuses and a network management system for managing said plurality of communication control apparatuses, said method comprising the steps of:
   a) permitting said network management system to create a first active program which stores a first address table of each communication control apparatus belonging to said group;
   b) permitting said network management system to transfer said first active program to said group of communication control apparatuses according to said first address table;
   c) permitting any one of said group of communication control apparatuses which has received said first active program to execute said first active program to thereby change said control mode and hold said control mode in a "standby state" to then record in said first address table a fact that said control mode thus changed is held in said "standby state" by said communication control apparatus, in which;
      c-1) if there is such a communication control apparatus in said group that is yet to execute said first active program, said first active program is transmitted to said communication control apparatus in said "unexecuted state" based on said first address table; and
      c-2) if there is no such a communication control apparatus in said group that is yet to execute said first active program, said first active program is transmitted to said network management system based on said first address table;
   d) permitting said communication control apparatus which has received said first active program to create a second active program which stores a second address table of each communication control apparatus which belongs to said group;
   e) permitting said network management system to transfer said second active program to said group of communication control apparatuses based on said second address table; and
   f) permitting such a communication control apparatus in said group that has received said second active program to execute said second active program to thereby switch said changed control mode from said "standby state" into an "operation state" and then record in said second address table a fact that said changed control mode is changed into said "operation state" by said communication control apparatus, in which:

f-1) if there is such a communication control apparatus in said group that is yet to execute said second active program, said second active program is transmitted to said communication control apparatus in said "unexecuted state" based on said second address table; and f-2) if there is no such communication control apparatus in said group that is yet to execute said second active program, said second active program is transmitted to said network management system based on said second address table.

5. The communication control apparatus controlling method according to claim 4, wherein said network system has a control network for managing said plurality of communication control apparatuses, in which said active program is transferred.

6. The communication control apparatus controlling method according to claim 4, wherein said plurality of communication control apparatuses has an active program decision portion for deciding whether data received through said network system is said active program, so that if said data is decided to be said active program, said active program is executed in active program processing.

7. A communication control apparatus controlling method, wherein when conducting control by use of an active program on a predetermined group among a later described plurality of communication control apparatuses in a network system having a plurality of interconnected communication control apparatuses and a network management system for managing said plurality of communication control apparatuses, said method comprising the steps of:

a) permitting said network management system to create a first active program which stores a first address table of each communication control apparatus belonging to said group;

b) permitting said network management system to transfer said first active program to said group of communication control apparatuses according to said first address table;

c) permitting any one of said group of communication control apparatuses which has received said first active program to decide whether said control can be conducted and then records a decision result thus obtained in said first address table, in which:

c-1) if there is such a communication control apparatus in said group that is yet to execute said first active program, said first active program is transmitted to said communication control apparatus in said "unexecuted state" based on said first address table; and c-2) if there is no such a communication control apparatus in said group that is yet to execute said first active program, said first active program is transmitted to said network management system based on said first address table;

d) permitting said communication control apparatus which has received said first active program to create a second active program which stores a second address table of each communication control apparatus which belongs to said group based on said decision result recorded in said first address table;

e) permitting said network management system to transfer said second active program to said group of communication control apparatuses according to said second address table; and f) permitting such a communication control apparatus in said group that has received said second active program to execute said second active program to thereby conduct said control and then record a control result thus obtained in said second address table, in which:

f-1) if there is such a communication control apparatus in said group that is yet to execute said second active program, said second active program is transmitted to said communication control apparatus in said "unexecuted state" based on said second address table; and f-2) if there is no such communication control apparatus in said group that is yet to execute said second active program, said second active program is transmitted to said network management system based on said second address table.

8. The communication control apparatus controlling method according to claim 7, wherein said network system has a control network for managing said plurality of communication control apparatuses, in which said active program is transferred.

9. The communication control apparatus controlling method according to claim 7, wherein said plurality of communication control apparatuses has an active program decision portion for deciding whether data received through said network system is said active program, so that if said data is decided to be said active program, said active program is executed in active program processing.

10. A communication control apparatus controlling method, wherein when changing a control mode for a predetermined group among a later described plurality of communication control apparatuses in a network system having a plurality of interconnected communication control apparatuses and a network management system for managing said plurality of communication control apparatuses, said method comprising the steps of:

a) permitting said network management system to create an active program which stores an address table of each communication control apparatus belonging to said group and an active program which stores contents of said control mode and processing contents of error recovery processing;

b) permitting said network management system to transfer said active program to said group of communication control apparatuses according to said address table;

c) permitting any one of said group of communication control apparatuses which has received said active program to execute said active program, if yet to do so, to thereby change said control mode, in which:

c-1) if changing of said control mode succeeded, a success is recorded in said address table and then, based on said address table, said active program is transmitted to such a communication control apparatus in said group that is yet to execute said active program; and c-2) if changing of said control mode fails, a failure is recorded in said address table and then, said active program has processing contents thereof switched to said error recovery processing and is transmitted to such a communication control apparatus in said group that successfully executed said active program based on said address table; and d) permitting said communication control apparatus in said group that has received said active program thus switched to said error recovery processing to execute said active program to thereby execute said error recovery processing and then, based on said address table, transmits said active program thus switched to said error recovery processing to such a communication control apparatus in said group that successfully executed said active program but is yet to execute said error recovery processing.

11. The communication control apparatus controlling method according to claim 10, wherein said network system has a control network for managing said plurality of communication control apparatuses, in which said active program is transferred.

12. The communication control apparatus controlling method according to claim 10, wherein said plurality of communication control apparatuses has an active program decision portion for deciding whether data received through said network system is said active program, so that if said data is decided to be said active program, said active program is executed in active program processing.

13. A communication control apparatus controlling method, wherein when changing a control mode for a predetermined group among a later described plurality of communication control apparatuses in a network system having a plurality of interconnected communication control apparatuses and a network management system for managing said plurality of communication control apparatuses, said method comprising the steps of:

a) permitting said network management system to create an address table for each communication control apparatus belonging to said group and an active program which stores contents of said control mode and time conditions;

b) permitting said network management system to transfer said active program to said group of communication control apparatuses according to said address table;

c) permitting any one of said group of communication control apparatuses which has received said active program to execute said active program to thereby change and holds said control mode in a "standby state" and also set said time conditions and record in said address table a fact that said communication control apparatus held said changed control mode in said "standby" state, in which:

c-1) if there is such a communication control apparatus in said group that is yet to execute said active program, said active program is transmitted to said communication control apparatus in said "unexecuted state" based on said address table; and c-2) if there is no such communication control apparatus in said group that is yet to execute said active program, said active program is transmitted to said network management system based on said address table;

d) permitting said communication control apparatus which has executed said active program to switch said changed control mode from said "standby state" into an "operation state" as far as said time conditions set hold true.

14. The communication control apparatus controlling method according to claim 13, wherein said network system has a control network for managing said plurality of communication control apparatuses, in which said active program is transferred.

15. The communication control apparatus controlling method according to claim 13, wherein said plurality of communication control apparatuses has an active program decision portion for deciding whether data received through said network system is said active program, so that if said data is decided to be said active program, said active program is executed in active program processing.

* * * * *